Dec. 5, 1939.  W. KEILWAGEN  2,182,084
EDUCATIONAL DEVICE
Filed Jan. 23, 1939
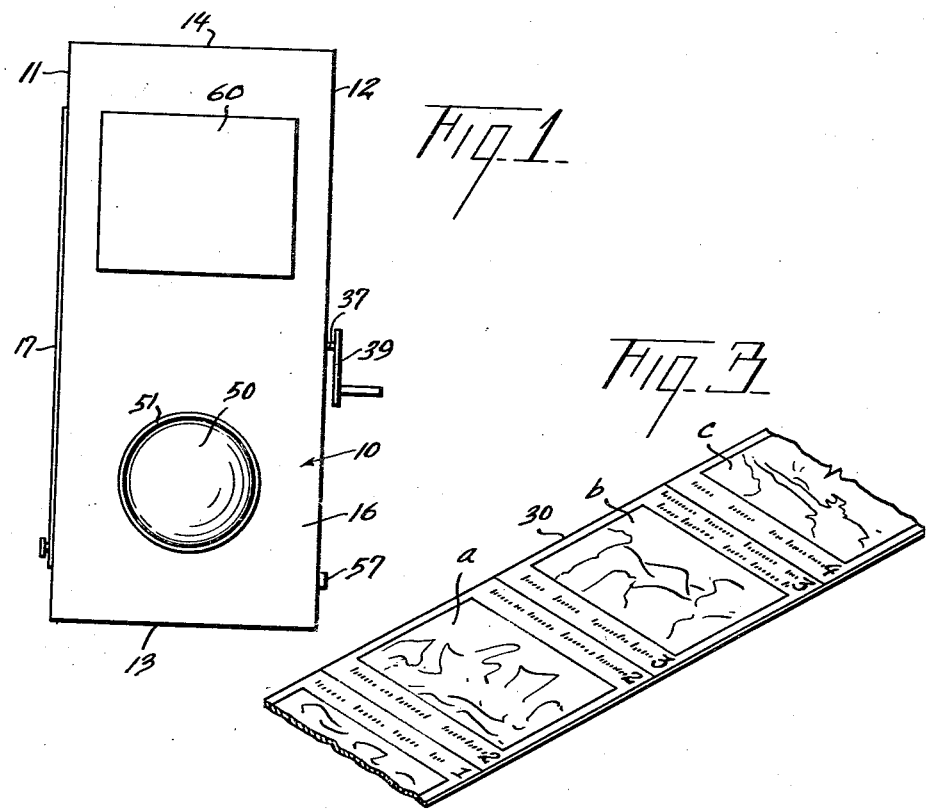
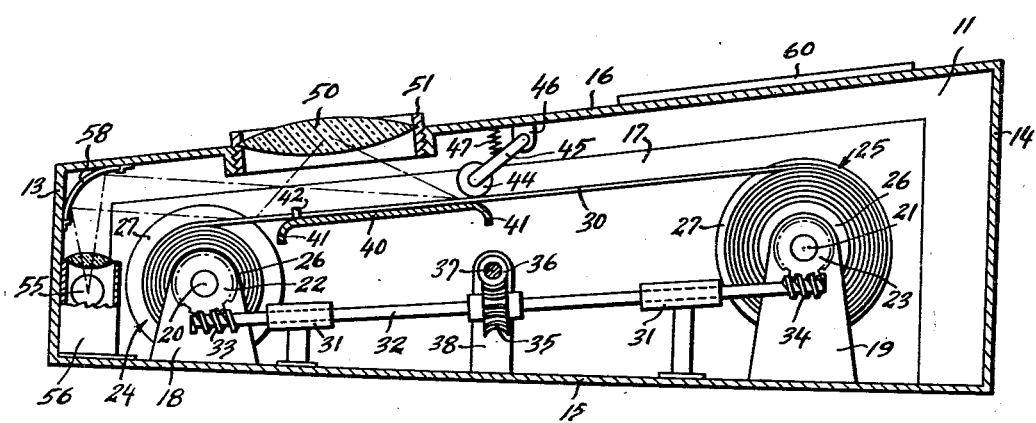
Inventor
Walter Keilwagen
By Carl Miller
Attorney Patented Dec. 5, 1939

2,182,084

UNITED STATES PATENT OFFICE 2,182,084

EDUCATIONAL DEVICE

Walter Keilwagen, Milwaukee, Wis.

Application January 23, 1939, Serial No. 252,406

3 Claims. (Cl. 40—95)

This invention relates to educational devices and more particularly to a pictorial educational device.

The principal object of this invention is to provide a device of this character primarily adapted for home use in which a plurality of pictorial showings relating to the arts, sciences, travel, etc., are provided on a band adapted to be wound from one reel onto another reel by a suitable manually operative mechanism controlled by the observer, there being further provided on the housing of the device a magnifying lens through which the individual pictorial showings are viewed, as they are sequentially moved past the lens, the pictorial showings under the lens being illuminated so as to be clearly seen by the observer.

Another object of this invention relates to the mounting of the pictures on the band in spaced apart relation each picture being provided with a suitable legend describing the subject matter thereof and each picture being further numbered.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figure 1 is a top view of the device,

Figure 2 is a longitudinal sectional view through the device showing details of construction thereof, and Figure 3 is a perspective view of a portion of a band showing manner of mounting of pictures thereon.

Referring to the drawing in detail, 10 denotes the housing or cabinet of the device which may be of any desired shape or size and formed of any desired material. In the preferred form, the cabinet 10 is in the shape of a rectangular box comprising side walls 11, 12, a front wall 13 of less height than the rear wall 14, a base 15 and a top 16 inclined towards the front wall 13, as clearly shown in Figure 2. The side wall 11 is provided with a door 17 to permit access into the interior of the cabinet.

Mounted within the cabinet 10 and on the base 15 in longitudinally spaced apart relation, are the reel supports 18 and 19, the front support 18 being preferably made shorter than the rear support 19. On the reel supports 18 and 19 are respectively positioned the spindles 20 and 21 on one end of which are fixedly attached the worm wheels 22 and 23. The reels 24 and 25 are detachably mounted on the spindles 20 and 21 in any desired manner so as to be readily mounted thereon and removed, the reels 24 and 25 being preferably of the same size so as to be interchangeable on the spindles and supports. The reels 24, 25 are in the form of spools embodying a hub 26 and end discs 27, the showing in Figure 2 having an end disc omitted on each reel so as to show the band 30 wound thereon.

Provided on the base 15 are the bearing supports 31 for a shaft 32, the ends of which are formed to provide the worms 33 and 34, respectively meshing with the worm wheels 22 and 23. Arranged on the shaft 32 intermediate the bearing supports 31 is a worm wheel 35 which meshes with a worm 36 fitted on the crank spindle 37, the inner end of which is rotatably supported in the bracket 38. The other end portion of the crank spindle projects outwardly of the side 12 of the cabinet and has connected thereto a crank 39. Thus rotation of the crank in one direction will simultaneously operate the worm gear drive to rotate the reel spindles 20—21, and reels carried thereby in one direction, and a rotation of the crank in the opposite direction will impart a simultaneous rotation of the reels in the other direction. This simultaneous drive of the reels prevents any pull on the band 30 thus obviating any possibility of the same tearing as it is unwound from one reel and wound on the other and vice versa. The intermediate position of the worm drive 35, 36 for the shaft 32 allows the placement of the crank 39 substantially centrally of the side 12 of the cabinet 10 rendering its rise convenient to the position of the observer in front of the cabinet.

It is to be distinctly understood that this invention contemplates the use of any other suitable operating means for the reels as for example a chain drive, a crank and connecting rod drive, a gear drive, a belt drive or a separate crank drive for each reel spindle. The use of such drives are so well known as to constitute in effect mechanical equivalents of each other.

Between the reels 24 and 25 and adjacent the reel 24 mounted on the lower or front support 18 is a platen 40 having rounded ends 41 over which the band 30 is placed for movement thereon. The platen 40 is suitably supported within the cabinet 10 and serves to support the band 30 in proper position for viewing the picture thereon at its supported portion. Preferably the platen 40 is given a slight forward and downward inclination and adjacent its front end is provided with upstanding guide lugs 42 one on each side thereof, between which the band 30 moves. To prevent any possible buckling of the band 30 as it moves across the platen 40 and to hold the same smooth and flat thereon there is provided at the rear end of the platen a superposed roller 44, bearing on said platen and carried by a yoke 45 swingably mounted on the bracket 46 attached to the underside of the top 16. Between the yoke 45 and top 16 is provided a spring 47 which applies a yielding pressure of the roller 44 on the band 30, in the manner clearly apparent, which is sufficient to hold the band 30 flat while at the same time is not great enough to set up any substantial frictional resistance to the movement of the band 30.

Provided on the top 16 above the platen 40 is a magnifying lens 50 mounted in a sleeve 51 having threaded engagement with a boss 52. The type of lens 50 should be such as to clearly magnify the pictures on the band 30 as they are sequentially moved into position on the platen and beneath the lens. The sleeve 51 is adjustable in the boss 52 so as to permit proper focusing of the lens.

In order to illuminate the pictures on the band 30 as they are positioned beneath the lens 50, there is provided within the cabinet 10, an electric bulb 55 supported within a suitable holder 56 arranged in a vertical position adjacent the front wall 13 of the cabinet. The holder 56 may contain a flash-light battery (not shown) for lighting the bulb 55, and the switch for operating the same may be placed in the side wall 12 as at 57. In place of the flash-light battery the bulb holder 56 may be suitably connected by an electric wire (not shown) to an electric light socket in the manner well known.

Arranged above the light bulb 55 is a mirror reflector 58 of any suitable size and shape which is so designed as to deflect the rays of light onto the picture on the band supported by the platen as indicated by the dot and dash lines, thereby rendering the picture visible to the observer.

The band 30 may be made of paper, fabric, or any other suitable material of any desired length, width and thickness. Mounted or directly printed on the band 30 are the pictures a, b, c, see Figure 3, each of which is provided with a marginal space carrying a suitable legend describing the same, and each picture being preferably given a number, to prevent overturning thereof, or in other words to facilitate the proper placing of each picture on the platen 40 and beneath the lens 50. If desired, each side of the band may carry pictures.

On the top 16 of the cabinet there is provided a holder 60 on which is placed the paper, map, sketch, diagram or other explanatory data relating to the pictures on the band viewed by the observer.

From the above description it is thought that the operation of the device is obvious.

As will be apparent the invention has a multitude of uses. The bands mounted on reels may carry any form of pictorial representation for any educational purpose. Thus, for example, the invention is suitable for stamp collections and for art studies of pictures and sculptures and other objects in various museums. The pictures on a band may carry the illustrations accompanying a novel, travel story, scientific text or treatise, etc. In industry, this invention may serve as a means for manufacturers to advertise their merchandise.

Having thus described my invention, I claim as new and desire to secure by Letters Patent:

1. An educational device of the character described comprising a horizontal cabinet including a base, side walls, front and rear walls with the latter of greater height than the former and a forwardly and downwardly inclined top, longitudinally spaced front and rear vertical reel supports mounted on the base of said cabinet with said rear support being of a greater height than said front support, a reel detachably mounted on a reel spindle carried by each reel support for rotative movement therewith and a band carrying printed or pictorial matter or both wound on one reel and adapted to be unwound therefrom and wound on the other reel, that portion of the band bridging said reels being inclined downwardly and forwardly in parallel relation to said cabinet top, manually operated driving means connected with both said reel spindles whereby to simultaneously rotate said reels in the same direction to affect said winding and unwinding of said band, adjustable lens means provided on said cabinet top arranged with reference to said inclined band portion as to permit the viewing of only a part thereof adjacent the reel on the front reel support, electric light means mounted on said base between the front wall and front reel support adapted to project a beam of light vertically towards said top, and reflecting means mounted at the corner of said front wall and top adapted to reflect said light onto said part of the inclined portion of said band whereby to illuminate the same.

2. The educational device as set forth in claim 1, wherein said manually operating means comprises, a worm wheel mounted on an end of each reel spindle, a shaft, a worm at each end of said shaft meshing with said reel worm wheels, bearing supports for said shaft, a worm wheel on said shaft intermediate the ends thereof, a crank spindle carrying a worm meshing with said shaft worm wheel, a bearing bracket supporting one end of said crank spindle, the other end of said crank spindle projecting outwardly of a side of said cabinet, and a crank fixed to the projecting end of said crank spindle.

3. The educational device as set forth in claim 1, including a downwardly and forwardly inclined rectangular platen arranged between said reel supports and beneath said lens, lug means on the longitudinal sides of said platen adjacent the front side thereof for guiding said band in its movement across said platen, and a spring pressed roller engaging said band adjacent the rear side of said platen to hold the same flat thereon.

WALTER KEILWAGEN.